United States Patent
Davis et al.

(10) Patent No.: US 8,197,196 B2
(45) Date of Patent: *Jun. 12, 2012

(54) BUSHING AND CLOCK SPRING ASSEMBLY FOR MOVEABLE TURBINE VANE

(75) Inventors: Brian Michael Davis, West Chester, OH (US); Billy T. Wood, Cincinnati, OH (US); Gregory William Reimels, Loveland, OH (US); Louis Bruno Lorenzi, Wyoming, OH (US)

(73) Assignee: General Electric Company, Schenectady, NY (US)

( * ) Notice: Subject to any disclaimer, the term of this patent is extended or adjusted under 35 U.S.C. 154(b) by 1502 days.

This patent is subject to a terminal disclaimer.

(21) Appl. No.: 11/948,570

(22) Filed: Nov. 30, 2007

(65) Prior Publication Data

US 2009/0060721 A1 Mar. 5, 2009

Related U.S. Application Data

(63) Continuation-in-part of application No. 11/848,801, filed on Aug. 31, 2007, now Pat. No. 8,061,975.

(51) Int. Cl.
*F01D 17/16* (2006.01)

(52) U.S. Cl. .......... 415/160; 219/201; 219/541; 439/20; 439/21; 439/23; 439/164; 439/675

(58) Field of Classification Search .................. 415/155, 415/159, 160, 161; 439/15, 18, 20–23, 27, 439/164, 675; 219/200, 201, 523, 541
See application file for complete search history.

(56) References Cited

U.S. PATENT DOCUMENTS

| | | | |
|---|---|---|---|
| 2,638,295 A | 5/1953 | Sheets | |
| 4,502,746 A * | 3/1985 | Wawra et al. | 439/15 |
| 4,821,758 A | 4/1989 | Ruis | |
| 5,061,195 A | 10/1991 | Bolen | |
| 5,623,821 A | 4/1997 | Bouiller et al. | |
| 6,413,043 B1 | 7/2002 | Bouyer | |
| 6,474,941 B2 * | 11/2002 | Dingwell et al. | 415/162 |
| 6,619,916 B1 | 9/2003 | Capozzi et al. | |
| 7,121,727 B2 * | 10/2006 | Bruce et al. | 384/297 |
| 8,061,975 B2 * | 11/2011 | Davis et al. | 415/160 |
| 2004/0120618 A1 | 6/2004 | Bruce et al. | |
| 2005/0008482 A1 | 1/2005 | Allford et al. | |
| 2008/0087541 A1 | 4/2008 | Dellaert et al. | |
| 2009/0060720 A1 | 3/2009 | Davis et al. | |

\* cited by examiner

*Primary Examiner* — Christopher Verdier
(74) *Attorney, Agent, or Firm* — David J. Clement; Trego, Hines & Ladenheim, PLLC (57) ABSTRACT

A bushing assembly for a turbine vane includes a bushing, housing, and a flexible conductor. The bushing includes a bore for receiving a trunnion of the vane and a first conductor extending from the bushing. The first conductor is adapted to be connected to a heater element disposed on the vane. The housing is positioned over the bushing, and the bushing is rotatable relative to the housing. The housing includes a second conductor extending from the housing for connection to an electrical power source. The flexible conductor is electrically connected between the first conductor and the second conductor, such that an electric current is transmitted from the second conductor to the first conductor to provide an electric current to the heater element.

19 Claims, 7 Drawing Sheets

BUSHING AND CLOCK SPRING ASSEMBLY FOR MOVEABLE TURBINE VANE

CROSS-REFERENCE TO RELATED APPLICATIONS

This application is a Continuation-In-Part of application Ser. No. 11/848,801, Filed Aug. 31, 2007, now U.S. Pat. No. 8,061,975.

STATEMENT REGARDING FEDERALLY SPONSORED RESEARCH AND DEVELOPMENT

The U.S. Government may have certain rights in this invention pursuant to contract number N00019-04-C-0093 awarded by the Department of the Navy.

BACKGROUND OF THE INVENTION

This invention relates generally to variable inlet guide vanes for gas turbine engines and more particularly to bushings and clock springs for such vanes.

Gas turbine engines often include airfoil-shaped inlet guide vanes for directing inlet flow to a downstream fan or compressor. In some applications the inlet guide vanes have a variable effective angle in order to throttle mass flow through the engine as needed in different operating conditions.

Portions of the engine near its forward end, including the inlet guide vanes, are subject to ice accretion in some flight conditions. This ice is typically removed by directing heated bypass air on or through the inlet guide vanes. Unfortunately, use of bleed air directly impacts engine efficiency and requires relatively heavy high-temperature pipes and valving.

It is known to use electrical heating for de-icing, for example using slip rings to transfer electrical current from a helicopter rotor head to the rotor blades. However, variable inlet guide vanes must react significant gas loads not present in other applications and thus must be firmly supported at their points of rotation, making delivery of electrical current more difficult. Furthermore, the guide vane bushings must be packed into a tight physical space.

BRIEF SUMMARY OF THE INVENTION

These and other shortcomings of the prior art are addressed by the present invention, which provides an inlet guide vane bushing and clock spring that allows for the rotational degree of freedom of the inlet guide vane so as to provide unimpeded operation of the inlet guide vane, and provides an electrical current to a heater element to provide ice protection to the inlet guide vane.

According to one aspect of the invention, a bushing assembly for a turbine airfoil which is pivotable about a trunnion includes: a bushing having a bore for receiving the trunnion and a first conductor extending from the bushing and adapted to be connected to a heater element disposed on the airfoil; a housing positioned over the bushing and having a second conductor extending from the housing for connection to an electrical power source, wherein the bushing is rotatable relative to the housing; and a flexible conductor electrically connected between the first conductor and the second conductor, so as to be able to transmit an electric current from the second conductor to the first conductor.

According to another aspect of the invention, an airfoil assembly for a gas turbine engine includes: a turbine airfoil pivotally connected to an outer casing of the turbine engine; a bushing assembly carried by the outer casing and positioned over a trunnion of the airfoil so as to transfer gas loads from the airfoil to the outer casing, the bushing assembly including: a bushing having a first bore which receives the trunnion, a first electrical junction carried by an outer surface of the bushing, and a first conductor extending from the first electrical junction; a housing which receives the bushing for rotation therein, the housing having a second electrical junction and a second conductor extending from the second electrical junction for electrical connection to an electrical power source; a clock spring electrically connected to the first electrical junction and the second electrical junction, such that an electric current is transmitted from the second electrical junction to the first electrical junction; and a heater element disposed on an outer surface of the airfoil and electrically connected to the second conductor via the bushing assembly.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
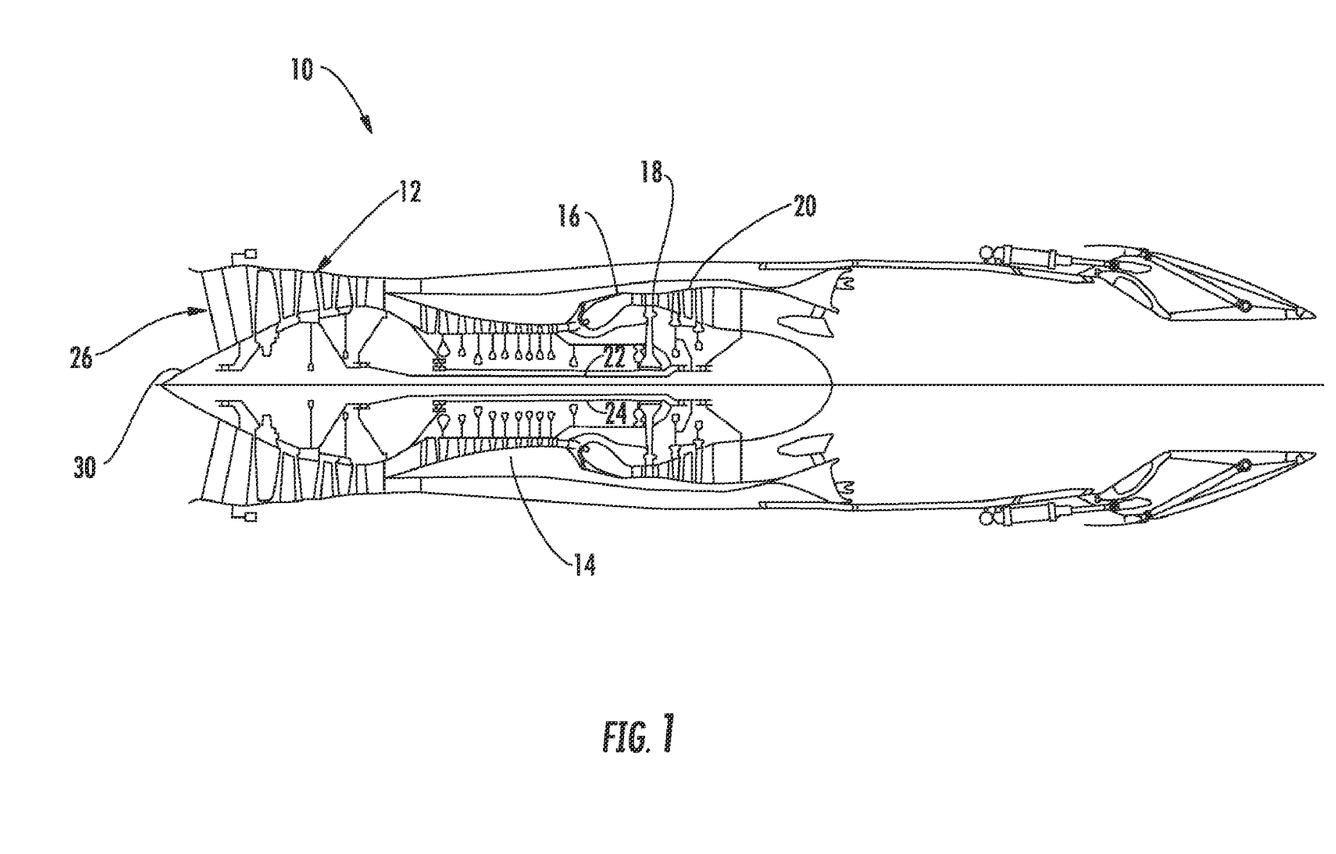
FIG. 1 is a cross-sectional view of a gas turbine engine including an inlet guide vane assembly constructed according to the present invention.

Referring to the drawings wherein identical reference numerals denote the same elements throughout the various views, FIG. 1 shows a gas turbine engine 10 having a fan assembly 12, a high pressure compressor 14, a combustor 16, a high pressure turbine 18, and a low pressure turbine 20, all arranged in a serial, axial flow relationship. The fan assembly 12 and the low pressure turbine 20 are coupled by a first shaft 22, and the compressor 14 and the high pressure turbine 18 are coupled by a second shaft 24.

A plurality of circumferentially-spaced inlet guide vane assemblies 26 are positioned at an inlet of the engine 10 and extend between an outer casing 28 (shown in FIG. 2) and a center hub 30 to direct airflow entering the engine 10 downstream to the compressor 14. While the invention will be described with respect to an inlet guide vane assembly, it will be understood that the principles thereof may be applied to any airfoil or portion thereof in a gas turbine engine which is pivotable.

In operation, air flows through the inlet guide vane assemblies 26 and fan assembly 12 via an air flowpath defined by the center hub 30 and the outer casing 28, such that compressed air is supplied from the fan assembly 12 to the high pressure compressor 14. The highly compressed air is then delivered to combustor 16. Airflow from the combustor 16 drives rotating turbines 18 and 20 and then exits the gas turbine engine 10.

Figure 2:
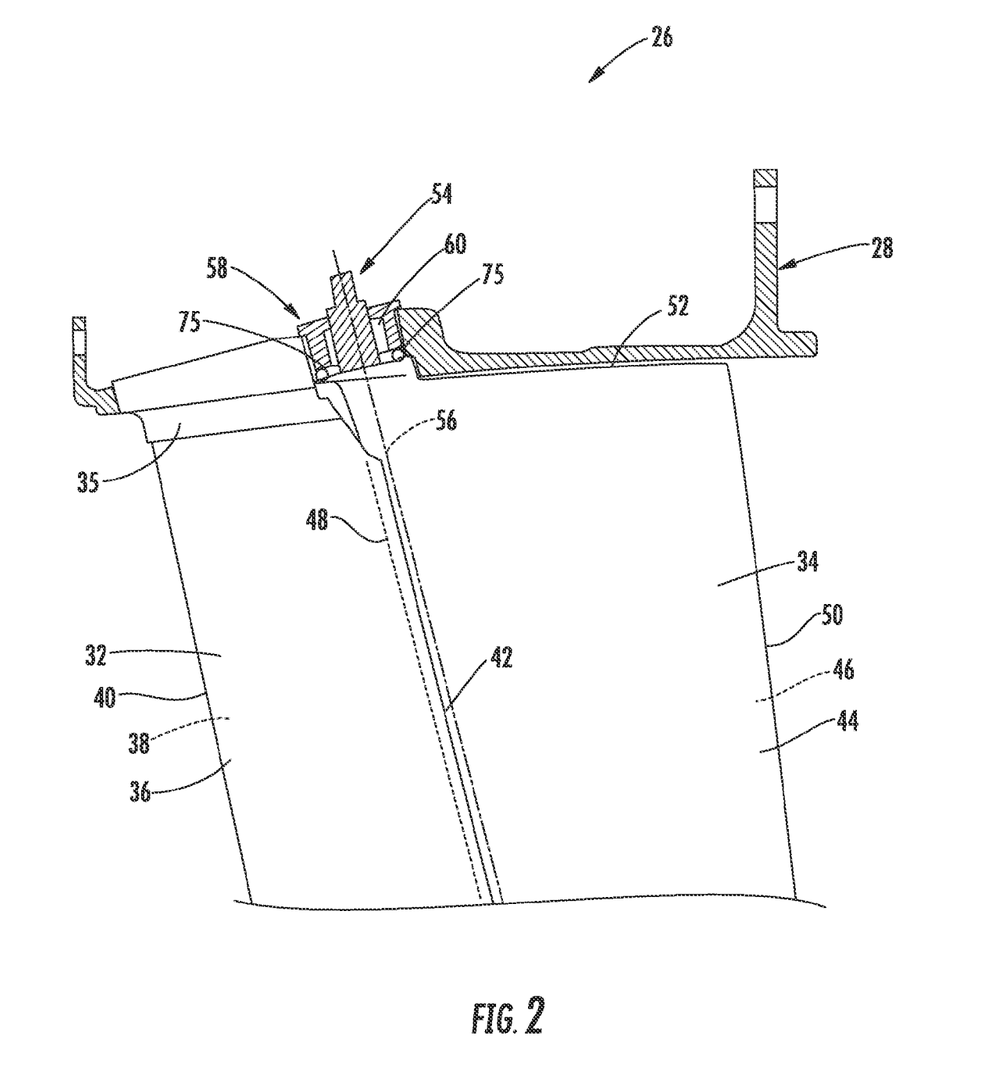
FIG. 2 is a partial side view of an inlet guide vane assembly.

As shown in FIG. 2, each inlet guide vane assembly 26 includes both an airfoil-shaped strut 32 and an airfoil-shaped flap 34. Struts 32 are spaced about a circumference of the hub 30 (shown in FIG. 1) and structurally support casing 28 in spaced relation to hub 30. The struts 32 are aerodynamically shaped to direct air entering the engine inlet around strut 32 towards the flap 34. Each strut 32 has a root (not shown), a tip 35, and a pair of sidewalls 36 and 38 that are connected at a leading edge 40 and a trailing edge 42.

A flap 34 is immediately downstream from each strut 32, and each includes a pair of sidewalls 44 and 46 connected at a leading edge 48 and trailing edge 50. Each sidewall 44 and 46 extends in radial span between a root (not shown) and a tip 52. The flaps 34 are pivotally coupled to the outer casing 28 by a trunnion 54 and are rotatable about a trunnion axis 56.

A bushing assembly 58 is positioned over the trunnion 54 between the trunnion 54 and the outer casing 28 to react gasloads from the flap 34. This allows the flaps 34 to be selectively positionable during engine operation to vary an angle of impingement of airflow directed downstream to the fan assembly 12. The bushing assembly 58 may be constructed of any material that will bear the operating loads on the trunnion 54. One example of a suitable material is a composite comprising carbon fiber reinforcing rods in a matrix of polyimide resin. Such composites are sold under the trade name VESPEL CP by E.I. DuPont De Nemours and Company of Wilmington Del., USA.

Figure 3:
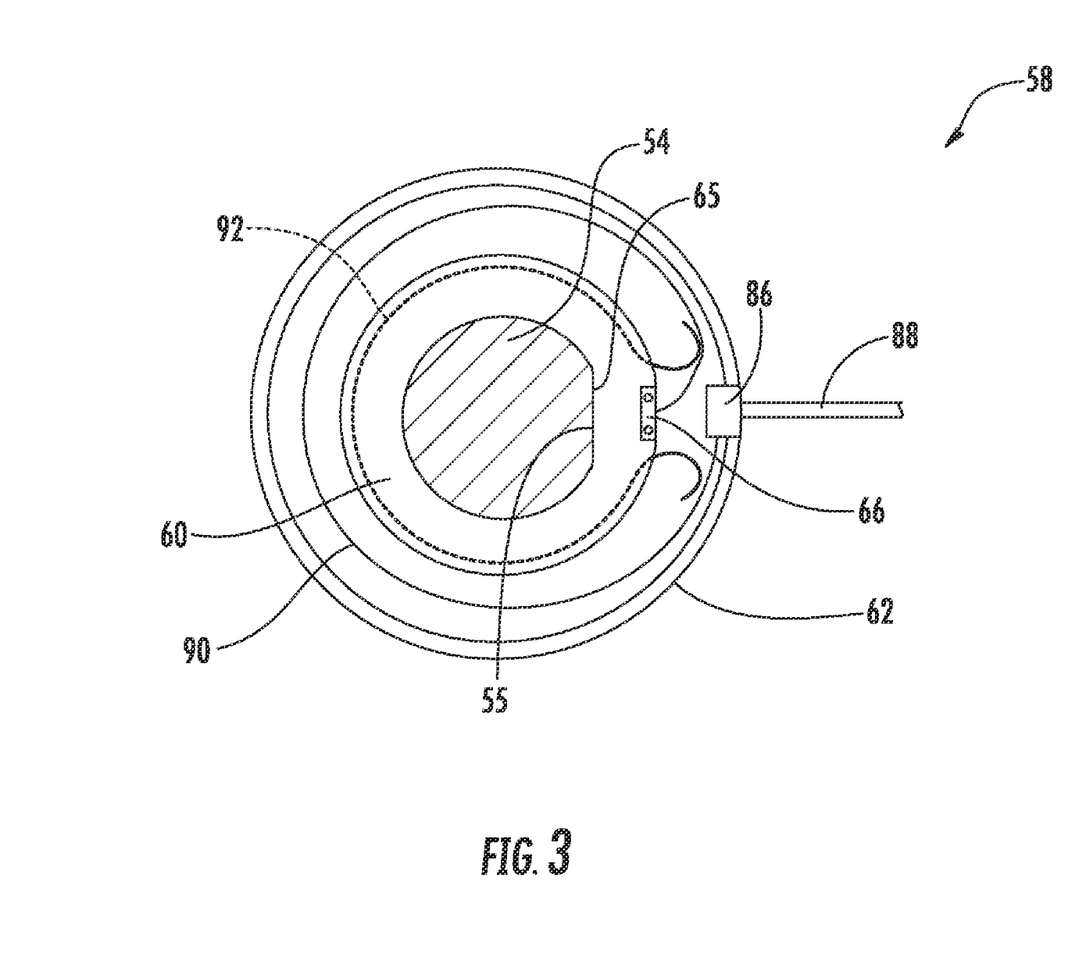
FIG. 3 is a top cross-sectional view of a bushing assembly of the inlet guide vane assembly of FIG. 2.
Figure 4:
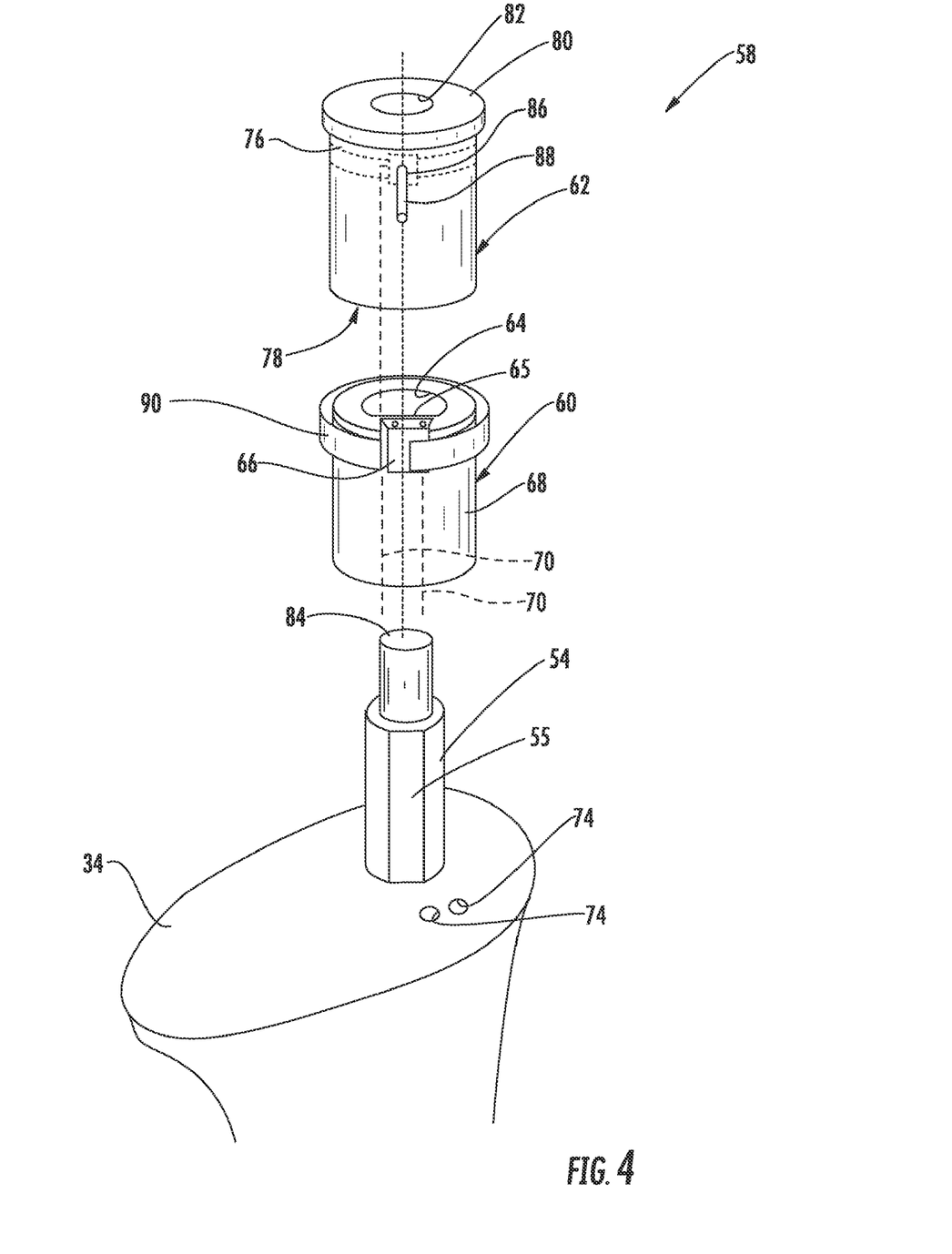
FIG. 4 is an exploded view of the bushing assembly of FIG. 3.
Figure 5:
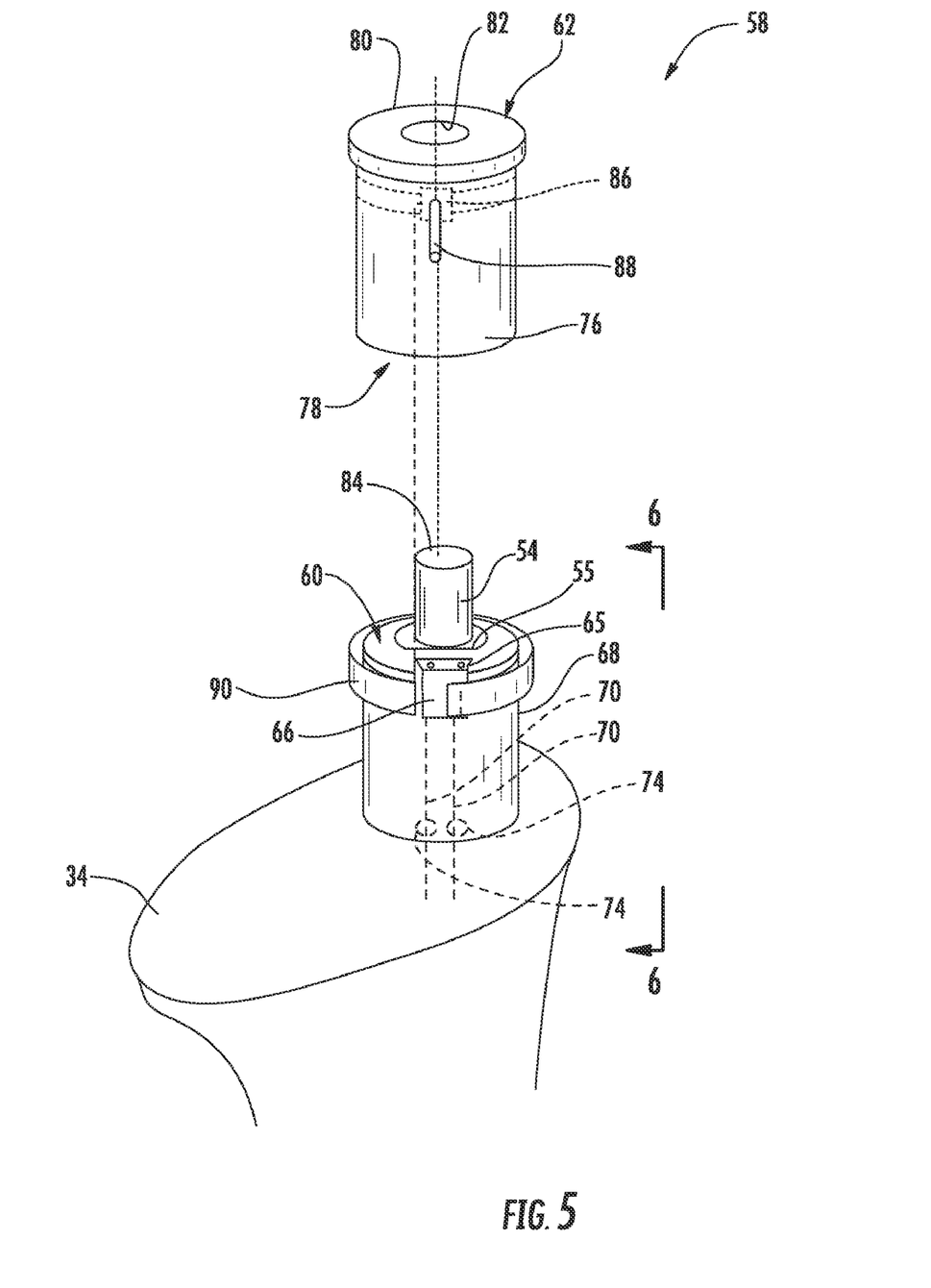
FIG. 5 shows a bushing of the bushing assembly of FIG. 3 positioned on the trunnion of the inlet guide vane.

Referring to FIGS. 3-6, the bushing assembly 58 includes a bushing 60 and a housing 62. The bushing 60 has a bore 64 therethrough for receiving the trunnion 54. Means are provided for preventing relative rotation between the bushing 60 and the trunnion 54. In the illustrated example the trunnion 54 has a flat 55 formed thereon which engages with a complementary flat 65 of the bushing 60. Alternatively, other known structures such as splines, gear teeth, keys or pins, or the like, could also be used for this purpose. Means are also provided for preventing relative rotation between the housing 62 and the casing 28. This could be implemented, for example, as a close fit between the housing 62 and casing 28, one or more elongated portions or flats on the housing 62, or structures such as splines, gear teeth, keys or pins. At least one electrical junction 66 is embedded into or mounted on the outer surface 68 of the bushing 60. Electrical conductors 70 extend from the junction 66 to a known type of heating element 72, shown in FIG. 7, mounted on an external surface of the flap 34. As shown in FIG. 5, the electrical conductors 70 extend into the flap 34 through apertures 74 and pass through the interior of the flap 34 to join the heating element 72. Other paths may be provided for the conductors 70, for example, trenches (not shown) may be formed in the surface of the flap 34. The electrical junction 66 and conductors 70 are manufactured of a metal or other conductive material suitable for transmitting an electrical current.

The housing 62 includes a sidewall 76 with a center bore 78 that receives the bushing 60. The bore 78 is closed off by an endwall 80 that includes an end bore 82 for allowing an end 84 of the trunnion 54 to extend therethrough. At least one electrical junction 86 is embedded into or mounted on the surface of the bore 78. As shown in FIG. 4, an electrical conductor 88 is routed from the electrical junction 86 through the housing 62 and exits the housing 62 for connection to a power source via an outboard wiring harness (not shown).

Figure 6:
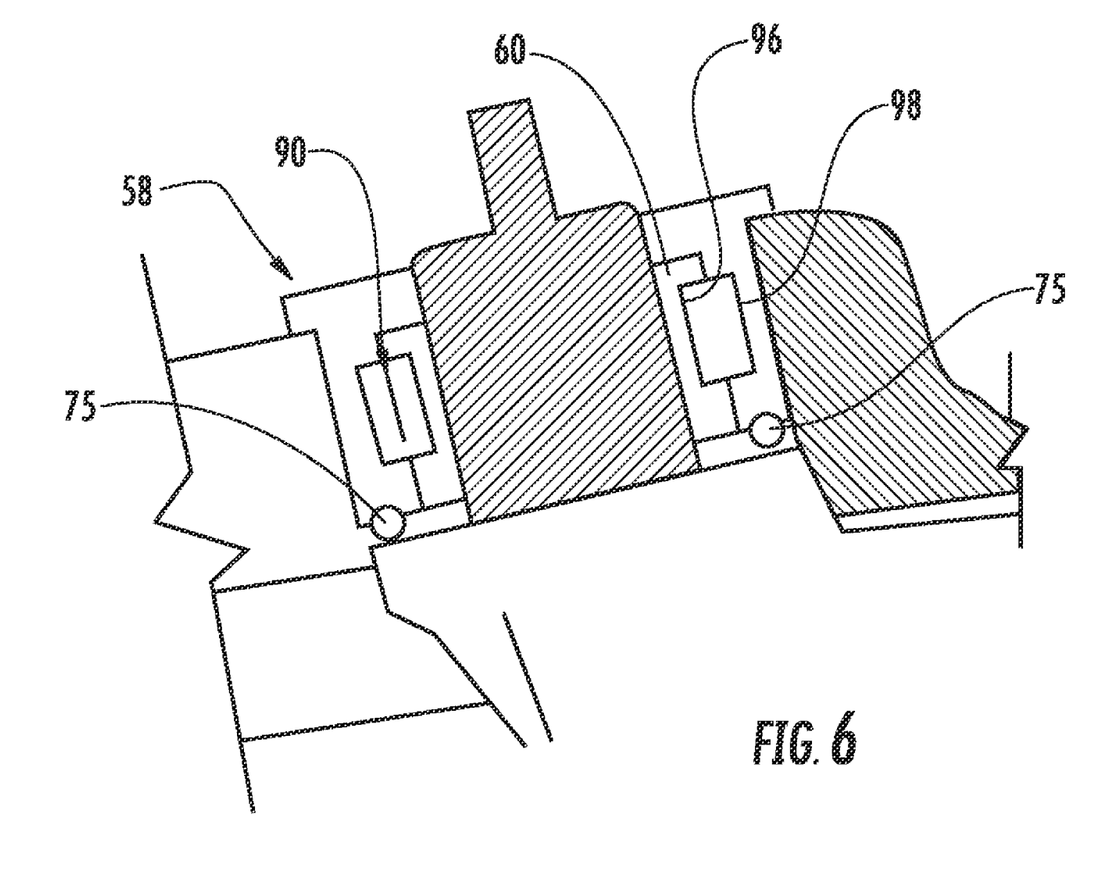
FIG. 6 is a cross-sectional view of the bushing assembly of FIGS. 3-5.
Figure 7:
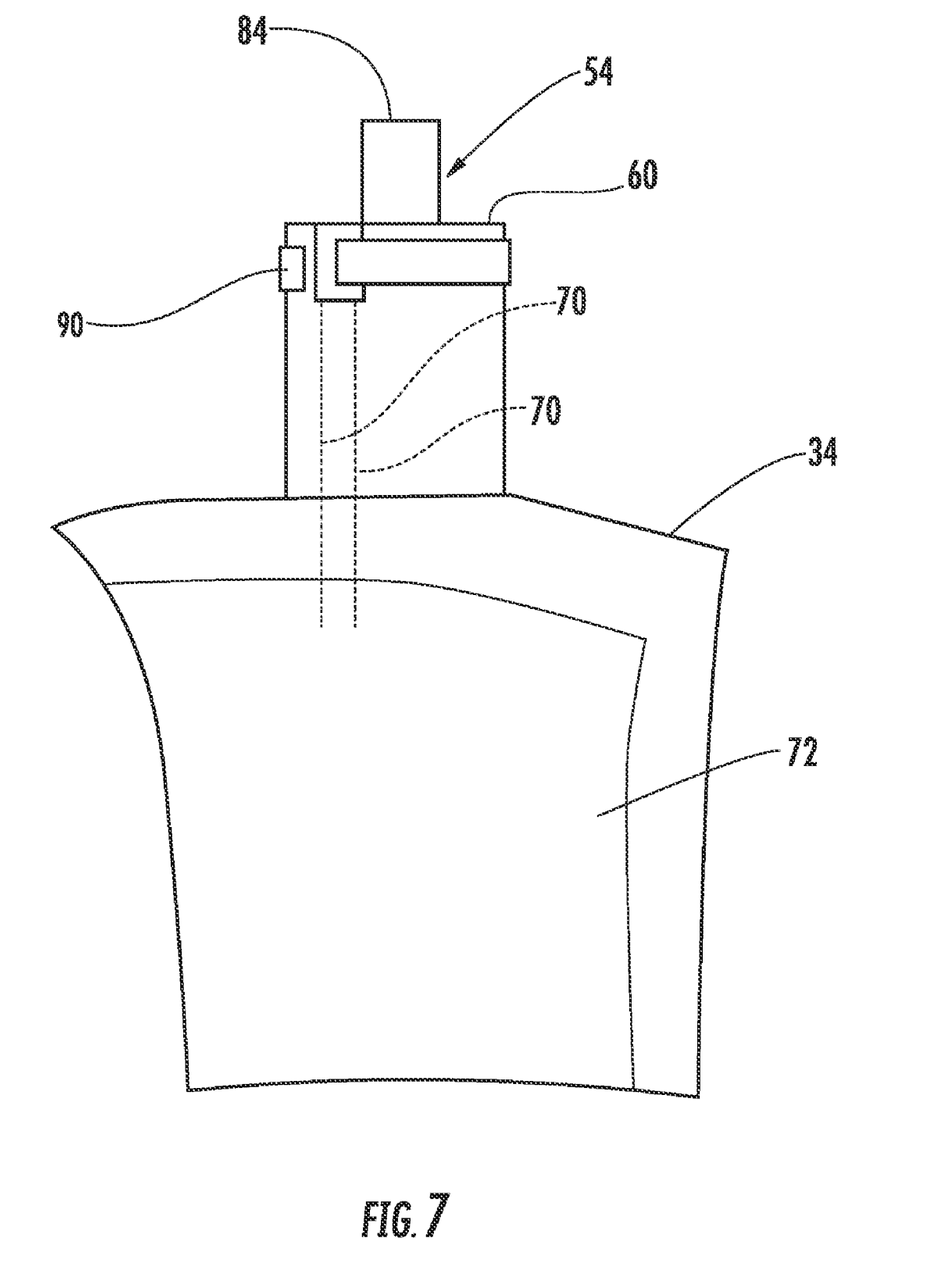
FIG. 7 is a side view of the bushing positioned on the trunnion of the inlet guide vane.

As illustrated in FIG. 3, a flexible electrical conductor, such as a clock spring 90, is electrically connected between the junction 66 and the junction 86. It should be appreciated that the clock spring 90 could be directly connected to the conductors 70 and 88, thereby eliminating the need for junctions 66 and 86. A fairlead 92 may be positioned around the bushing 60, as shown, to prevent the clock spring 90 from becoming bent or kinked. The clock spring 90 is manufactured of a metal or other conductive material and transmits electricity from the junction 86 to the junction 66 and to the heating element 72 via conductors 70. As shown in FIG. 6, the clock spring 90 resides within a groove 96 formed in the bushing 60 and a groove 98 formed in the surface of the bore 78 of the housing 62. It should be appreciated that the clock spring 90 could reside in a single groove formed in either the bushing 60 or the bore 78. The grooves 96 and 98 allow the clock spring 90 to contract around the bushing 60 and expand away from the bushing 60 during rotation of the trunnion 54 due to movement of the flap 34. For example, the clock spring 90 would contract when the trunnion 54 rotated clockwise and expand when the trunnion 54 rotated counter-clockwise.

As illustrated, each bushing assembly 58 includes a single electrical path for powering a single resistance heater. If desired, additional paths may be provided to provide redundancy or to implement zoned heating.

Any gap between the bushing assembly 58 and the flap 34 is sealed to prevent the entry of water or debris which might interfere with the electrical connections. As shown in FIG. 2, this is done by placing an O-ring 75 between the housing 62 and the flap 34, but other types of seals or gaskets could also be used.

The foregoing has described a bushing assembly for a moveable turbine vane. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A bushing assembly for a turbine airfoil which is pivotable about a trunnion, comprising:
   (a) a bushing having a bore for receiving the trunnion and a first conductor extending from the bushing and adapted to be connected to a heater element disposed on the airfoil;
   (b) a housing positioned over the bushing and having a second conductor extending from the housing for connection to an electrical power source, wherein the bushing is rotatable relative to the housing; and
   (c) a flexible conductor electrically connected between the first conductor and the second conductor, so as to be able to transmit electric current from the second conductor to the first conductor.

2. The bushing assembly according to claim 1, wherein at least one of the bushing and the housing includes a groove formed therein, wherein one or both of the grooves receive the flexible conductor, so as to allow the flexible conductor to move between a contracted position and an expanded position.

3. The bushing assembly according to claim 1, wherein the flexible conductor wraps around the bushing between the first conductor and the second conductor.

4. The bushing assembly according to claim 1, further including a first electrical junction embedded in an outer surface of the bushing and electrically connected between the first conductor and the flexible conductor.

5. The bushing assembly according to claim 1, further including a second electrical junction positioned in a bore of the housing and electrically connected between the second conductor and the flexible conductor.

6. The bushing assembly according to claim 1, further including a fairlead carried by the bushing so as to guide the flexible conductor around the bushing.

7. The bushing assembly according to claim 1, wherein the housing includes a sidewall defining a first bore for receiving the bushing therein.

8. The bushing assembly according to claim 7, wherein the housing includes an end wall positioned at an end of the sidewall, the end wall including a second bore for receiving a distal end of the trunnion therethrough.

9. An airfoil assembly for a gas turbine engine, comprising:
(a) a turbine airfoil pivotally connected to an outer casing of the turbine engine;
(b) a bushing assembly carried by the outer casing and positioned over a trunnion of the airfoil so as to transfer gas loads from the airfoil to the outer casing, the bushing assembly comprising:
   (i) a bushing having a first bore which receives the trunnion, the bushing having a first electrical junction carried by an outer surface of the bushing, and a first conductor extending from the first electrical junction;
   (ii) a housing which receives the bushing for rotation therein, the housing having a second electrical junction and a second conductor extending from the second electrical junction for electrical connection to an electrical power source; and
   (iii) a clock spring electrically connected between the first electrical junction and the second electrical junction; and
(c) a heater element disposed on an outer surface of the airfoil and electrically connected to the second conductor via the bushing assembly.

10. The airfoil assembly according to claim 9, wherein the heater element is electrically connected to the first electrical junction by the first conductor.

11. The airfoil assembly according to claim 10, wherein the first conductor extends through an interior of the airfoil for connection to the heater element.

12. The airfoil assembly according to claim 9, wherein the bushing assembly allows the trunnion to rotate relative to the outer casing while permitting the transmission of an electric current from an electrical power source to the heater element.

13. The airfoil assembly according to claim 9, wherein the first electrical junction is embedded in the outer surface of the bushing.

14. The airfoil assembly according to claim 9, further including a first groove formed in and extending circumferentially around the outer surface of the bushing.

15. The airfoil assembly according to claim 14, further including a second groove formed in an inner surface of the housing and positioned to mate with the first groove, such that when the airfoil pivots, the clock spring may expand or contract within the first and second grooves.

16. The airfoil assembly according to claim 9, wherein the clock spring wraps around the bushing between the first electrical junction and the second electrical junction.

17. The airfoil assembly according to claim 9, further including a fairlead carried by the bushing such that the clock spring wraps around the fairlead and the bushing without kinking.

18. The airfoil assembly according to claim 9, wherein the housing includes a sidewall surrounding the bushing and an end wall positioned at an end of the sidewall, the end wall including a second bore for receiving a distal end of the trunnion therethrough.

19. The airfoil assembly according to claim 9, wherein the airfoil is an inlet guide vane.

\* \* \* \* \*